US006556571B1

(12) United States Patent
Shahrier et al.

(10) Patent No.: US 6,556,571 B1
(45) Date of Patent: Apr. 29, 2003

(54) FAST ROUND ROBIN PRIORITY PORT SCHEDULER FOR HIGH CAPACITY ATM SWITCHES

(75) Inventors: Sharif M. Shahrier, Plainsboro, NJ (US); Alexander T. Ishii, Princeton, NJ (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/317,964

(22) Filed: May 25, 1999

(51) Int. Cl.$^7$ ................................................ H04L 12/56
(52) U.S. Cl. ............................ 370/395.4; 370/395.71; 370/394
(58) Field of Search ................................ 370/230, 232, 370/237, 238, 238.1, 395.1, 395.32, 395.41, 395.51, 395.71, 400, 413, 422, 470, 471; 709/102, 103

(56) References Cited

U.S. PATENT DOCUMENTS

| | | | |
|---|---|---|---|
| 5,301,333 A | | 4/1994 | Lee |
| 5,519,698 A | * | 5/1996 | Lyles et al. ............... 370/411 |
| 5,590,125 A | * | 12/1996 | Acampora et al. .......... 370/329 |
| 5,633,870 A | * | 5/1997 | Gaytan et al. ............. 370/235 |
| 6,034,958 A | * | 3/2000 | Wicklund .............. 370/395.32 |
| 6,188,690 B1 | * | 2/2001 | Holden et al. ............. 370/390 |
| 6,345,040 B1 | * | 2/2002 | Stephens et al. ........... 370/232 |
| 6,396,834 B1 | * | 5/2002 | Bonomi et al. ............ 370/394 |

FOREIGN PATENT DOCUMENTS

| EP | 0571166 A | 11/1993 |
|---|---|---|
| GB | 2307823 A | 6/1997 |

OTHER PUBLICATIONS

I. Iliadis, "Performance of a Packet Switch with Input and Output Queueing under Unblanced Traffic," *IEEE INFOCOM*, 1992.
I. Iliadis and W.E. Denzel, "Performance of Packet Switches with Input and Output Queueing," *IEEE ICC*, 1990.
A. Demers et. al., "Analysis and Simulation of a Fair Queueing Algorithm," *Journal of Internetworking: Research and Experience*, pp. 3–26, Jan. 1990.
S. Golestani, "A Self–Clocked Fair Queueing Scheme for Broadband Applications," *IEEE INFOCOM*, Jun. 1994.
J. Bennett and H. Zhang, "WF2Q: Worst–Case Fair Weighted Fair Queueing," *IEEE INFOCOM*, pp. 120–128, Mar. 1996.
M. Katevenis et al., "Weighted Round Robin Cell Multiplexing in a General Purpose ATM Switch Chip," *IEEE JSAC*, pp. 1265–1279, Oct. 1991.

* cited by examiner

*Primary Examiner*—Hassan Kizou
*Assistant Examiner*—Afsar M. Qureshi
(74) *Attorney, Agent, or Firm*—Sughrue Mion, PLLC (57) ABSTRACT

A novel architecture and implementation of a Round-Robin Scheduler (RRS) for high capacity ATM switches is presented. A port is selected from a set of alternating real-time/non real-time priority ports, based on the priority of the port, the minimum cell-rate (MCR) assigned to the ports and the backpressure signals coming from the output buffers. A fast implementation of the scheduler was derived using a binary tree structure. The nodes in the binary tree act as "cut through" switches, and thus the scheduler is able to operate at high speed. This scheduler is amenable for implementation in high speed silicon technology. It is compact in terms of logic gate requirements, very scalable and is a viable option in Gigabit ATM switches.

18 Claims, 7 Drawing Sheets

FAST ROUND ROBIN PRIORITY PORT SCHEDULER FOR HIGH CAPACITY ATM SWITCHES

BACKGROUND OF THE INVENTION

1. Field of the Invention

The present invention relates to network systems and switches that control the flow of data around the network, and more particularly to a high capacity asynchronous transfer mode (ATM) switches and schedulers that manage the flow of ATM cells through that switch.

2. Description of the Related Art

Figure 1:
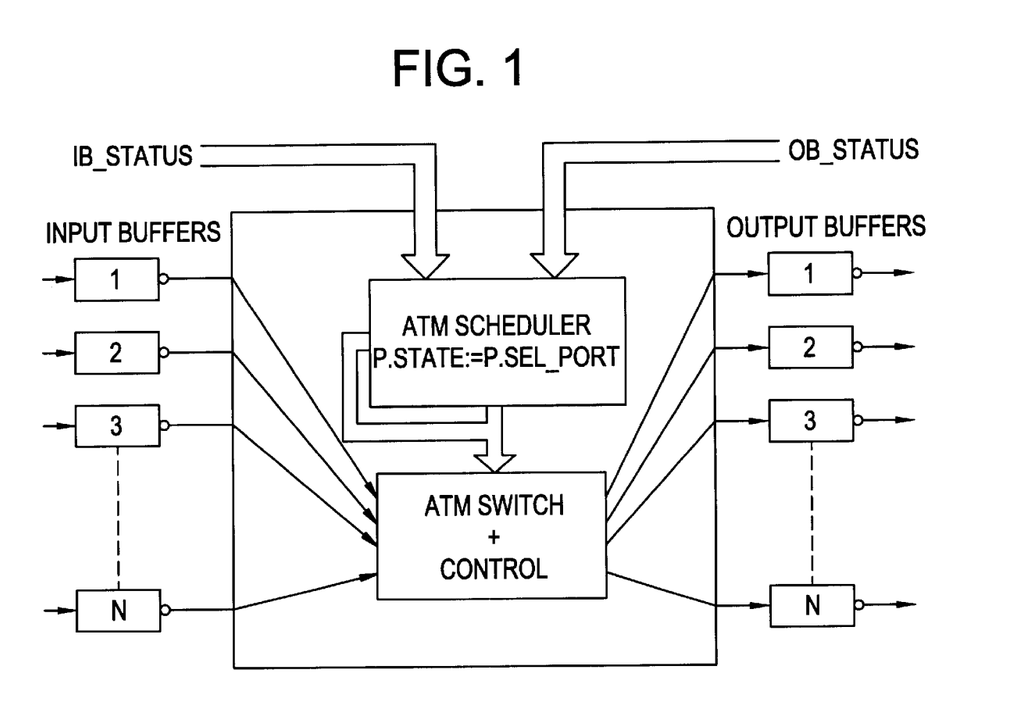
FIG. 1 is a diagram illustrating ATM switch architecture.

ATM switches has been deployed in numerous LAN/WAN and telecommunication systems. The basic architecture of an ATM switch is shown in FIG. 1. The switch consists on a set of input ports, a set of output ports and a centralized scheduler. Streaming ATM cells arrive at the input ports and are switched to its designated output port(s). Any input can go to any one of the outputs in a time variant manner as determined by the ATM scheduler. With many ATM switches, a restriction is imposed that during any cell-time, exactly one cell can be scheduled. This input can connect to one or several outputs. Hence, the mapping of inputs to outputs is a one-to-many operation. If one input is switched to only one output, the mode of connection is called unicast. If on the other hand, if an input is sent to multiple output ports, the connection is called multicast. The maximum rate at which the scheduler can perform these connections is a factor which determines the maximum throughput of the ATM switch.

A variety of ATM scheduler architectures have been presented in the literature. Many of these papers focus on the input/output buffered ATM switch. See I. Iliadis, "Performance of a Packet Switch with Input and Output Queueing under Unbalanced Traffic," *IEEE INFOCOM*, 1992 and I. Iliadis and W. E. DenZel, "Performance of a Packet Switch with Input and Output Queueing," *IEEE INFO COM*, 1990. In an input/output buffered switch, cell queuing occurs at the input ports. All the input buffers operate at the line rate, which can be 622 Mbits/sec. or at a similar rate. One of the drawbacks of input buffering is Head-Of-Line (HOL) blocking which results in an input cell not being sent because its output buffer is full. This problem may be alleviated by queueing cells in the input modules according to their destination ports. All the queues are stored in a shared common memory.

One of the earlier methods of scheduling ATM cells is First-In-First-Out (FIFO). This method services the connections in the order in which the cells arrive at the inputs. While this method is simple, it does not guarantee fair share bandwidth. To solve this problem, fair share schedulers have been proposed. See A. Demers et. al., "Analysis and Simulation of a Fair Queueing Algorithm," *Journal of Internetworking: Research and Experience*, pp. 3–26, January 1990, Golestani, "A Self-Clocked Fair Queueing Scheme for Broadband Applications," *IEEE INFOCOM*, June 1994, and J. Bennett and H. Zhang, "WF$^2$Q: Worst-Case Fair Weighted Fair Queueing," *IEEE INFOCOM*, pp. 120–128, March 1996. One type of fair share scheduling that has been proposed is the Weighted Round Robin. See M. Katevenis et. al., "Weighted Round Robin Cell Multiplexing in a General Purpose ATM Switch," *IEEE JSAC*, pp. 1265–1279, October 1991.

Figure 2:
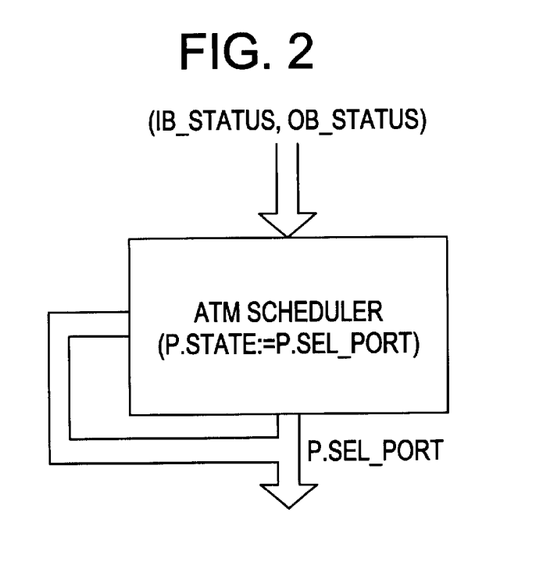
FIG. 2 is a diagram illustrating the architecture of the scheduler represented as a finite state machine.

For generality, the architecture of the scheduler can be represented as a finite state machine, as illustrated in FIG. 2. The present state of the finite state machine (FSM), labeled P_STATE, indicates the currently selected input port that is performing the switch connection. The next selected input port, labeled N_STATE, is a function of the present state P_STATE and the two input signals, IB_STATUS and OB_STATUS. The signals IB_STATUS and OR_STATUS are status signals from the input and output buffers respectively. IB_STATUS indicates which of the input buffers (IBs) are BUSY or NOT_BUSY, i.e. whether or not it contains a cell. OB_STATUS indicates the level of congestion at the output buffers (OBs) by asserting signals STOP, SHAPE or GO for the cells destined for a particular output buffer. Thus, GO indicates that cells may be sent to the OB at its maximum line rate, and conversely, STOP prohibits the transmission of cells. The SHAPE signal, instructs the slowing down of the transmission of cells to the OB. In this state machine, it is noted that the input signals and the present state is used to determine the next state: the FSM is called the Mealy machine.

While the prior art systems have improved the speed of switches through better scheduling, small improvements in speed may be very beneficial for network performance. Additionally, the above switches do not have a high degree of scalability. Thus, if the number of ports to a switch is increased, the total processing delay of the switch increases with the number of ports. The prior art systems are also not compact in terms of the logic gates required, which is especially important when the system is implemented in silicon technology.

SUMMARY OF THE INVENTION

An object of the present invention is to provide a scheduler for a high capacity ATM switch that employs a Round Robin Scheduler that is capable of operating at high speeds.

Another object of the invention is to provide a scheduler that is compact in terms of logic gate requirements and is very scalable.

Still another object of the invention is to provide a scheduler having a total processing delay of the switch that is logarithmic with increasing number of ports on the switch, instead of increasing linearly with the number of ports.

A further object is to provide a scheduler for a switch that has a robust architecture and is capable of greater throughput.

According to the first aspect of this invention, an ATM switch is provided for controlling a flow of ATM cells in a network having input ports, output ports, and a centralized scheduler. The centralized scheduler uses a tree architecture to process packets containing data referencing a previously selected input port. The scheduler then selects a particular input port from the set of input ports and, sends the ATM cell, at the head of the port queue, port to a designated output. The scheduler may alternately employ cut-through routing to select the particular input port.

In another embodiment, the centralized scheduler selects the particular input port based on detected ready states of said input port. The ready states may be a not ready state, an ordinary ready state or priority ready state where the states are used to set precedence in the scheduler. Additionally, the selected port may also be based on the minimum cell rates of the input ports.

In a third embodiment, the scheduler of the ATM switch employs a tree architecture structure having a binary tree structure or a quartinary tree structure. Additionally, the ATM switch can be operated in unicast and multicast modes of connection.

In a fourth embodiment, a method of scheduling input signals arriving at input ports to be sent to output ports is provided. The ready states of said input ports are determined, one of said input ports is selected in a round robin fashion based on said ready states, and the input signals are sent from the selected input ports to a designated output port. The selection process uses a tree architecture having a given number of nodes such that packets, containing information related to a previously selected input port, the ready states and the output ports, pass through the nodes and a particular packet is selected having the designated output port.

In a fifth embodiment, each of the nodes has two inputs and one output and determines which input is provided to said output by on the fly comparisons of certain bits of each packet.

In a sixth embodiment, the switch is an ATM switch.

In a seventh embodiment, the scheduling employs a tree architecture structure having a binary tree structure or a quartinary tree structure and may be operated in unicast and multicast modes of connection. In an eighth embodiment, the selection process is conducted in a weighted round robin fashion.

In the ninth embodiment, an ATM switch is provided for controlling a flow of ATM cells in a network having input ports, output ports, and a centralized scheduler. The centralized scheduler processes packets containing data referencing a previously selected input port. The scheduler functions so that the total processing delay in the flow of the ATM cells in the switch increases only logarithmically with an increase in the total number of ports. The scheduler then selects a particular input port of the input ports and to send a particular input port ATM cell to a designated output of the output ports.

Additional objects and advantages of the invention will be set forth in the description that follows, and in part will be obvious from the description, or may be learned through practice of the invention. The objects and advantages of the invention may be realized and obtained by means of the instrumentalities and combinations particularly pointed out in the appended claims.

DETAILED DESCRIPTION OF THE PREFERRED EMBODIMENTS

Figure 3:
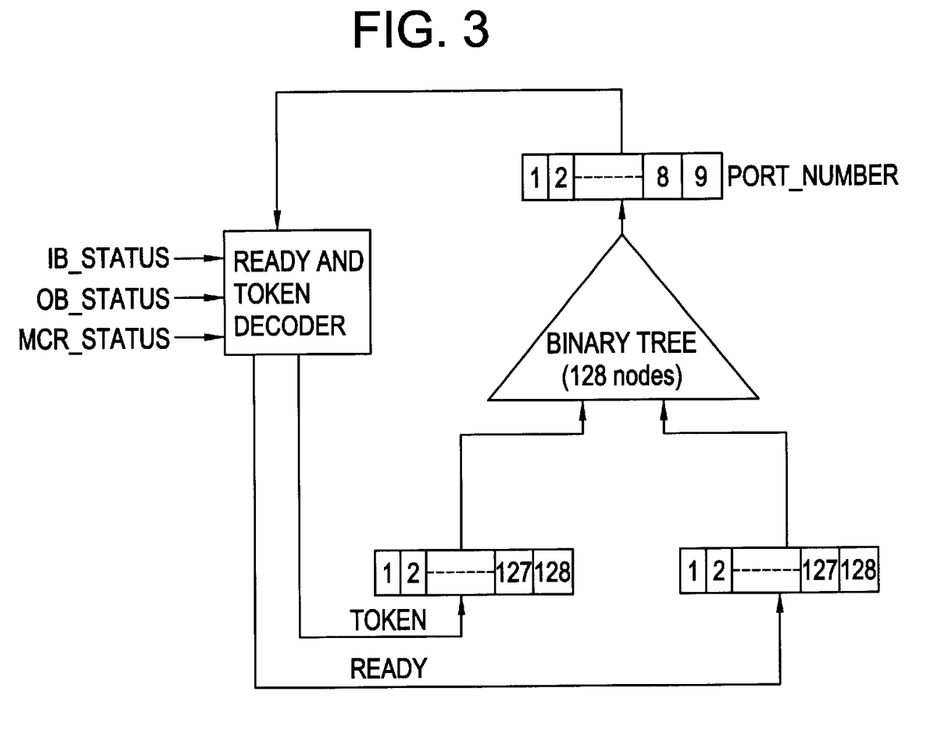
FIG. 3 is a diagram illustrating the ATM scheduler architecture for a 128 port input/output ATM switch.

The diagram in FIG. 3 depicts an ATM scheduler architecture for a 128 port input/output ATM switch. As explained earlier, the ATM scheduler can be conceived of as a finite state machine, where the next state depends on the present state and all the inputs. Each input port in the switch can be in one of three READY states: not ready, ordinary ready and priority ready. The scheduler has to select from one of the ready input ports in a round robin fashion with priority ready ports having priority over ordinary ready ports.

The READY signal for each port is obtained by logically combining the signals IB_STATUS, OB_STATUS and MCR_STATUS. If the READY bit position for a port is '1', it means that the port can send a cell to its designated output port(s) referred to as OB(s). If the bit is '0', the port is not permitted to send a cell. The OB_STATUS signal is the backpressure signal from the OB(s), indicating the level of congestion at the output port. Each OB can be in one of three states: STOP, SHAPE or GO. Each OB transmits a 2-bit status signal back to the input ports indicating which of the three states its in. The truth in Table 1 shows the encoding for the OB_STATUS bits. Each port is also assigned a Minimum Cell-Rate known as the MCR rate which it must sustain at all times. The MCR signals for each port is periodic, and they are generated externally to the port selector sub-macro block. The MCR signal is used to override the SHAPE signal and make the port priority ready. The port is also priority ready if IB_STATUS and MCR_STATUS are both set and the port is in GO mode. A rule is assigned port is priority ready, all ordinary ready signals are disabled, i.e. set equal to zero. The truth tables in Table 2 show how to generate the ready signals.

TABLE 1

| Status Bits | | Unicast | | Multicast | |
|---|---|---|---|---|---|
| $b_1$ | $b_0$ | RT | NRT | RT | NRT |
| 0 | 0 | STOP | STOP | STOP | STOP |
| 0 | 1 | SHAPE | SHAPE | STOP | STOP |
| 1 | 0 | SHAPE | SHAPE | SHAPE | SHAPE |
| 1 | 1 | GO | GO | GO | GO |

TABLE 2(a)

| IB_STATUS | STOP (RT) | SHAPE (RT) | MCR_STATUS | READY | Ready type |
|---|---|---|---|---|---|
| 0 | X | X | X | 0 | not ready |
| 1 | 1 | X | X | 0 | not ready |
| 1 | 0 | 1 | 0 | 0 | not ready |
| 1 | 0 | 0 | 0 | 1 | ordinary ready |
| 1 | 0 | 1 | 1 | 1 | priority ready |
| 1 | 0 | 0 | 1 | 1 | priority ready |

TABLE 2(b)

| IB_STATUS | STOP (NRT) | SHAPE (NRT) | MCR_STATUS | READY | Ready type |
|---|---|---|---|---|---|
| 0 | X | X | X | 0 | not ready |
| 1 | 1 | X | X | 0 | not ready |
| 1 | 0 | 1 | 0 | 0 | not ready |
| 1 | 0 | 0 | 0 | 1 | ordinary ready |
| 1 | 0 | 1 | 1 | 1 | priority ready |
| 1 | 0 | 0 | 1 | 1 | priority ready |

The significance of READY is that if an input buffer has a cell ready to go, and it is not blocked by any of its destination OBs, the READY bit will be set. To be more precise, if the input buffer has a cell to transmit (IB_STATUS is '1'), and all OB(s) to which the cell is to be sent are in GO state (or SHAPE with the MCR bit being set), the READY bit will be set. Otherwise, the READY bit will not be set.

Figure 4:
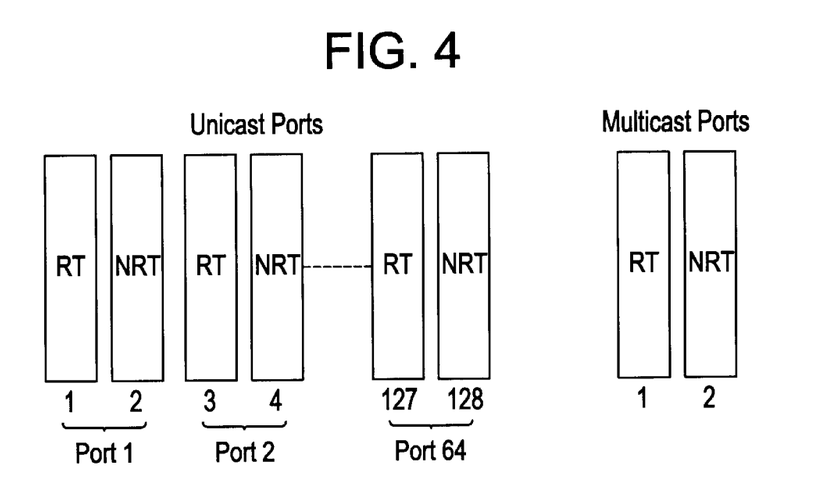
FIG. 4 illustrates the organization of the ports of the ATM switch.

There are two types of active READY signals: ordinary ready and priority ready. The rule is that if any port is priority ready, then all ports that are ordinary ready are masked out. In other words, their READY signals are disabled. The switch has 128 unicast ports that are equally divided between real-time ports (RT) and non real-time ports (NRT). Thus, there are 64 RT ports and 64 NRT ports for unicast. In addition, there is one RT and one NRT port for multicasting respectively. This organization is depicted in FIG. 4.

The sending of cells works differently for the multicast ports compared to the unicast ports. The unicast port sends one cell to its designated OB if it is ready, whereas the multicast port can send a cell to multiple OBs. The sending of cells by the multicast port operates as follows.

Each multicast port is assigned a destination port vector (DPV), 16 bits long, each bit indicating whether the port is to send to that particular OB. In other words, if the bit is set, the port will send to that OB, otherwise the port will not send. All the OBs specified by the DPV must be ready to receive, otherwise the multicast will not send to any of the OBs. In order to eliminate Head-Of-Line (HOL) blocking, a look back of 4 is performed. Thus, if all the destined OBs of any of the previous 4 cells in the port queue are ready to receive, the multicast port will send to that set of OBs.

Figure 5:
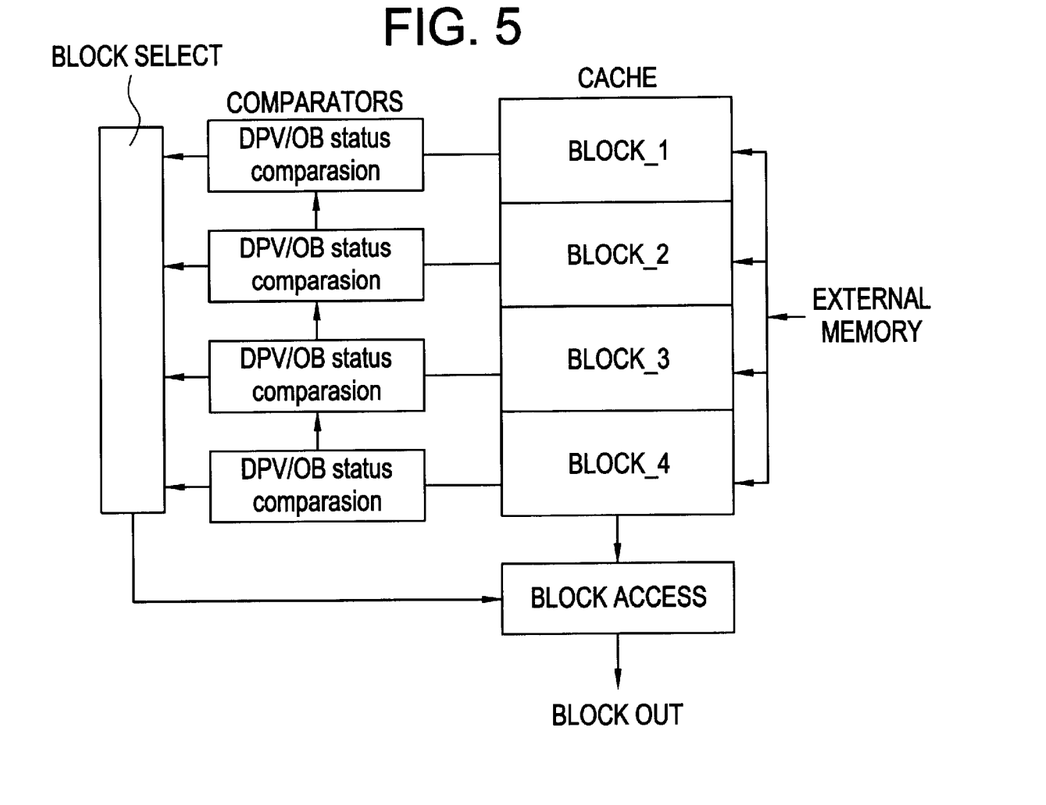
FIG. 5 shows the architecture to implement multicast lookback of 4.

To perform a lookback of 4 of multicast cells in a timely manner, it is necessary to store the descriptors of the first 4 multicast cells in an on-chip cache memory. The cache is organized into 4 blocks with 2×4 bytes in each block. This is the same size as an ATM cell descriptor. Thus, the total size of the cache is 8×4 bytes. The DPV fields within each block is stored in 16-bit registers. When the multicast port is selected, all the 4 registers are compared associatively with the status indicated by the OB status register. A "hit" will occur if all the destination OBs within any one of the 4 DPVs can accept a cell. If there is more than one hit, then the cache blocks are accessed in FIFO order. The Scheduled Queue Identifier (SQI) block associated with the selected multicast cell is then read from the cache. The architecture to implement the look back of 4 is shown in FIG. 5. The precedence for selecting the multicast ports can be summarized as follows.

Each multicast SQI is assigned a DPV, 16 bits long, each bit indicating whether the port is to send to that OB. The DPV field are bits 31 down to 16 of SQI word 2.

Since there are 64 OBs, a 2-bit Plane Indicator (PI) is used to indicate which subset of 64 OBs, the DPV represents.

Multicast port is ready if it can send to all OBs, specified in its DPV.

To eliminate HOL blocking, a look-back of 4 is done for both RT and NRT lists.

Multicast cache stores first 4 SQIs, so after an SQI is read out, it is replaced by one from the multicast port list in external memory.

A hit will occur if all the destination OBs specified by the DPV are not STOP.

In case of multiple hits, cache blocks are accessed in FIFO order.

The port scheduler/selection may be implemented using a binary tree. The binary tree for a 128 port input/output ATM switch has 127 nodes altogether. There are 64 leaf nodes in the tree with each leaf node having two incoming links. Each link represents an input port of the switch, thus for a 128 port switch, there are 128 links connecting the leaf nodes. Bit positions are connected from two registers to the links. These registers are named TOKEN and READY and will be defined in the subsequent paragraphs. Initially, The port selection procedure involves scanning the port READY bits from left to right starting from the last selected port bit-position. The scanning proceeds until a '1' bit is encountered and this port becomes the newly selected port. If a '1' bit is not encountered while scanning the bits from left to right, the bits are scanned from left to right, starting from the first bit up to the last selected bit position. Similarly, the scanning proceeds until a '1' bit is encountered and this port becomes the newly selected port. In practice, the scanning of the bits on both sides of the last selected port bit position are done simultaneously. This procedure is further explained with an example as follows.

Considering an 8 port input/output switch, the ports are numbered from 1 to 8. As explained previously, there are two vectors, named READY vector and TOKEN vector. The READY vector has as many bits as the number of input ports (8). Each bit within the READY vector indicates whether the corresponding port is ready or not ready. The ready status of port 1 is indicated by the MSB of the READY vector. If the current status of the switch has the READY vector 01011010 where each bit from left to right represents ports 1 to 8 respectively. The underlined bit, associated with the ports, is the currently selected port. Scanning the bits to the right of the underlined bit, the fist bit encountered which is '1' is bit 7. Thus, the next selected port is port number 7. After port selection, bit 7 is underlined to reflect that it is the newly selected port. The READY vector will now be 01011010. At the next round of port selection there are no 1's at the right of the underlined bit. Thus, the bits will be scanned on the left of the underlined bit. The first '1' encountered is bit 2, which means that port 2 will be the next selected port. Thus, 01011010 is the resulting READY vector.

In addition to the READY bit vector, there is a bit vector named TOKEN. The TOKEN vector is the same size as the READY vector. The previous example, where READY=

01011010, can be used to explain how the bits in the TOKEN vector are derived. In this case, TOKEN=11111000, where: all the bits to the left of and including the underlined bit position are set to '1', and all the other bits to the right of the underlined bit are set to '0'. Thus, for the case where READY=01010000, TOKEN will be 11111110. And finally, for READY=01010000 TOKEN is 11111111. Also, as a side note, TOKEN=00000000 is equivalent to TOKEN= 11111111. Finally, each bit in the READY bit vector is referred to as a "READY bit", and in the TOKEN bit vector as a "TOKEN bit".

Figure 6:
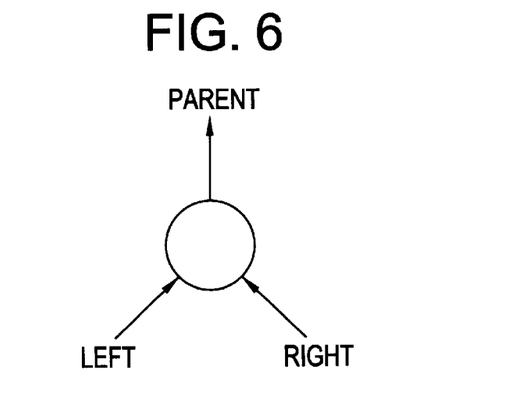
FIG. 6 illustrates the structure of each node of the binary tree structure.

Each port in the input/output switch is identifiable by an 8-bit number called the PORT_NUMBER. There are 128 ports altogether, numbered 1 to 128, and are represented by the 8-bit PORT_NUMBER. The READY bit and TOKEN bit corresponding to the port PORT_NUMBER are appended to the LHS of PORT_NUMBER to form a 10-bit packet. At the start of port selection, 128 different packets corresponding to each port are applied to the corresponding links associated with the leaves of the binary tree as shown in FIG. 8. Each node in the binary tree has two incoming links and one outgoing link as shown in FIG. 6. The input links and the output link are labeled RIGHT, LEFT and PARENT links respectively. The packets applied to the leaves, traverse through the tree and one of them eventually propagates through the PARENT link of the root node. This packet contains the PORT_NUMBER of the newly selected port.

As the packets are routed up the tree, the tree is effectively performing a fast implementation of the scanning algorithm that was described earlier. Each node in the tree accepts packets on its LEFT and RIGHT links, performs comparisons on bits 8 and 9 on the fly, and routes the appropriate packet up through its PARENT link. The routing of packets up the tree is done in a cut-through manner, i.e. there is no buffering at the nodes. In addition, the processing at the nodes is very simple, thus making the implementation very simple and fast.

Figure 7:
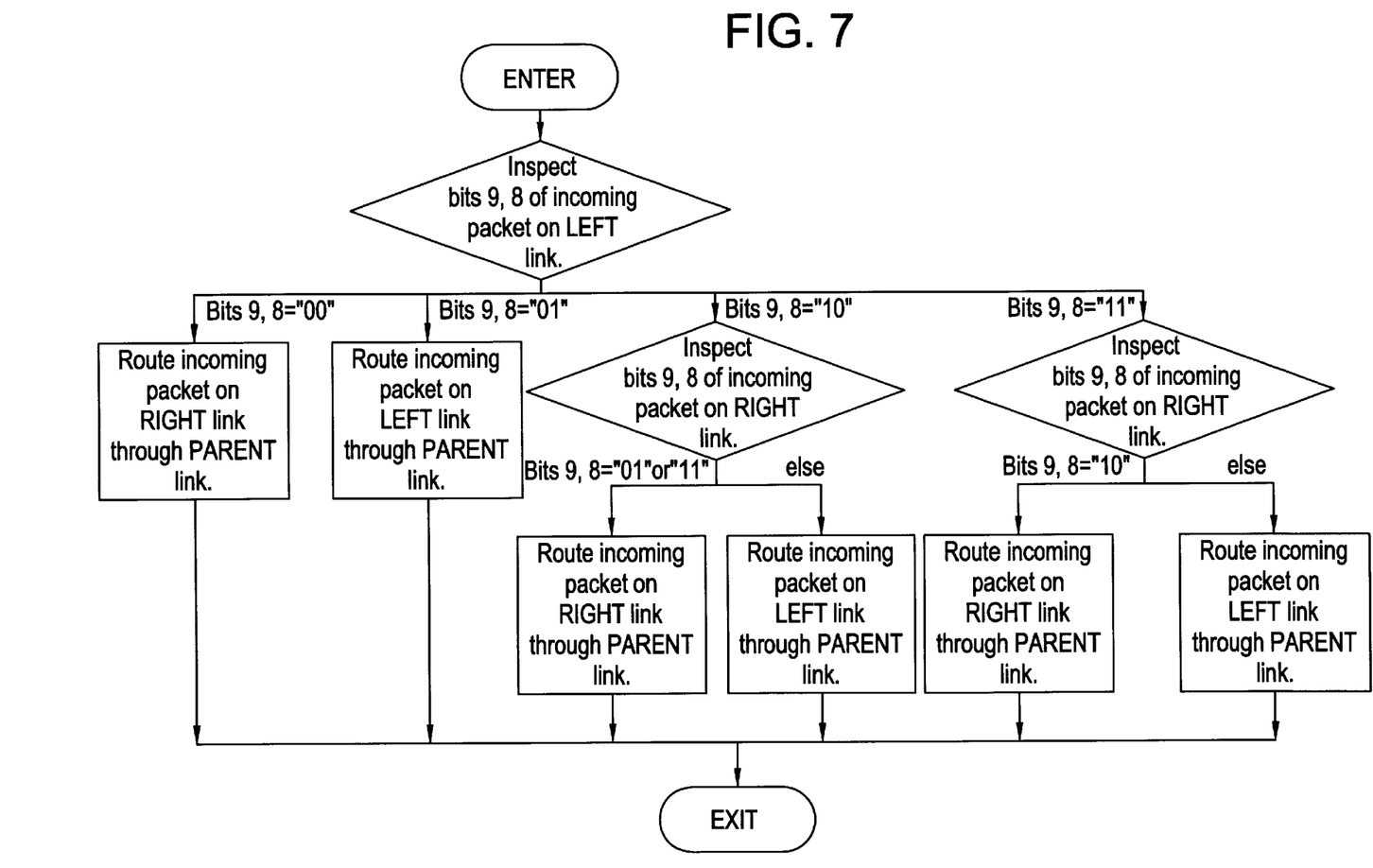
FIG. 7 is a diagram depicting the processing of packets by a node element.

The flowchart in FIG. 7 illustrates how a node element route packets incoming on its RIGHT and LEFT links through its PARENT link. The first action by the node is to inspect bits 9,8 of the incoming packet on its LEFT link. Depending on the setting of these bits, one of four possible actions are taken. If bits 9,8 are "00", or "01", then incoming packets on the RIGHT and LEFT link respectively are routed through the PARENT link. If on the other hand, bits 9,8 are "10", or ("11"), then the bits 9,8 of the incoming packet on the RIGHT link are inspected. If these bits are "01", or "11" or ("10") as shown in the diagram, the incoming packet on the RIGHT link is routed to the PARENT. In the other cases, the incoming packet on the LEFT link is routed to the PARENT. The packets progress up the tree starting from the leaf nodes. The packet that emanates from the root node contains the PORT_NUMBER of the newly selected port.

Figure 8A:
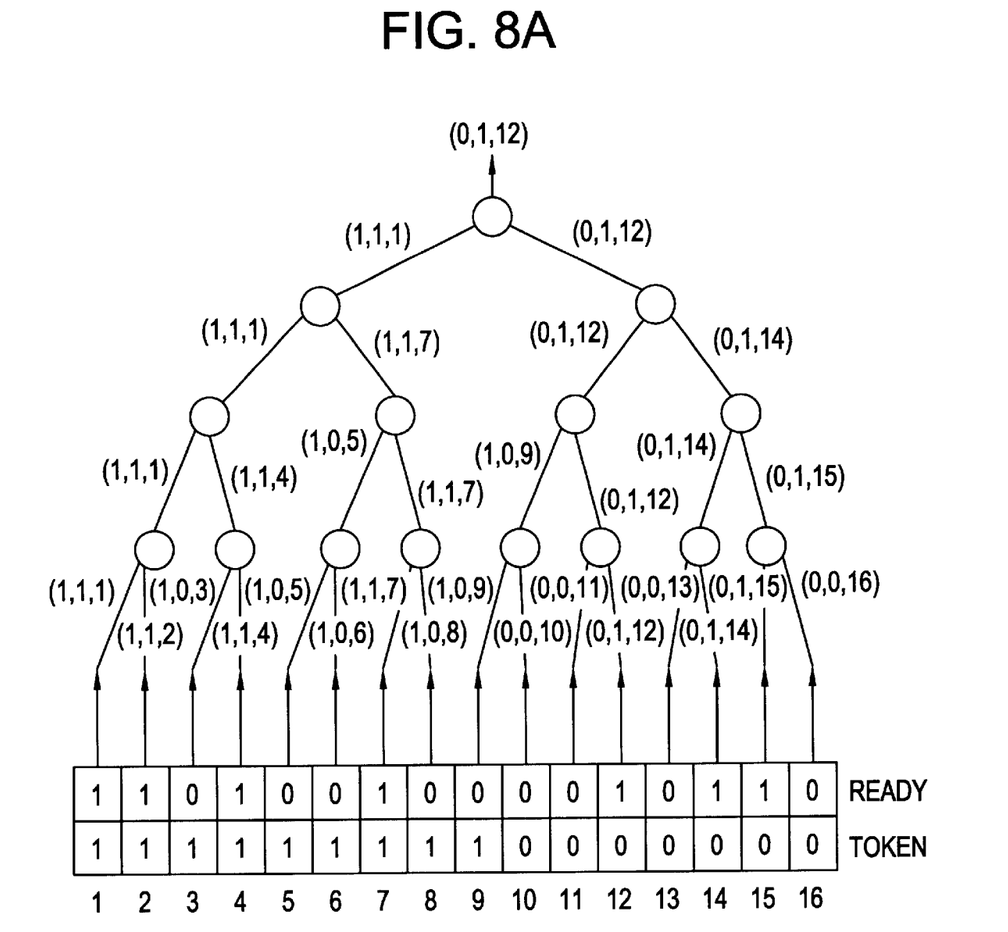
FIGS. 8(a) and 8(b) illustrate examples showing how the binary tree operates in selecting a port.

An example to show how the binary tree operates in selecting a port will now be described. A 15-node tree structure is presented in FIG. 8. This structure is used to select one of 16 ports. It is assumed that the last port selected was port 9. Thus, the TOKEN vector is set so that all the bits to the left of and including bit 9 are set to '1', and all the bits to the right of 9 are set to '0'. Also assume that the READY vector has the bit settings as shown in FIG. 8(*a*). A 3-field packet is formed consisting of the TOKEN bit, READY bit and PORT_NUMBER. These packets are applied to the incoming links of the leaf nodes as shown in FIG. 8(*a*). Each node switches one of the two incoming packets in its RIGHT and LEFT links onto its PARENT link using the flowchart shown in FIG. 7. The packet which comes out of the root node contains the selected port number.

Figure 8B:
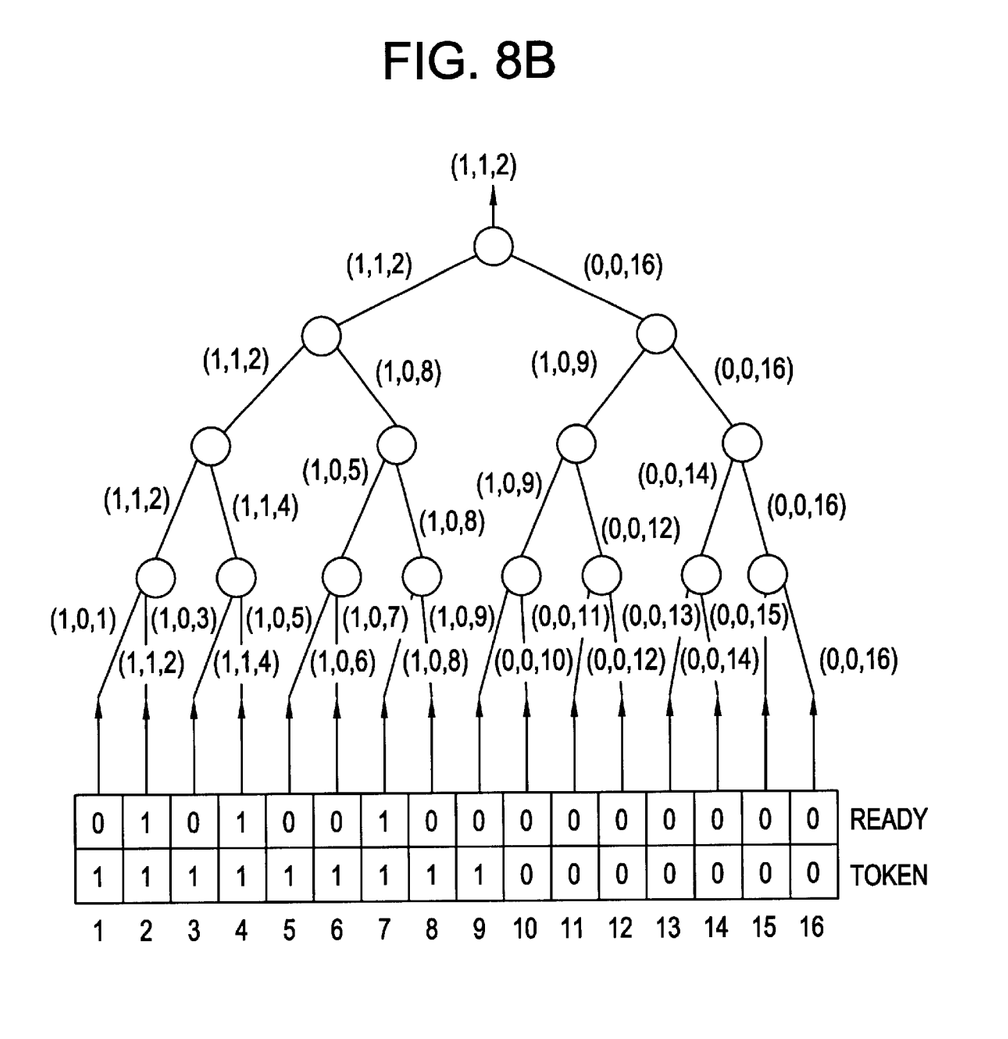

In the example shown in FIG. 8(*a*), the packet coming out of the root node contains 12 as the selected port number. Noting that the last selected port was port 9. Hence, the first port which has its READY bit set on the right hand side of port 9 is port 12. Thus, the tree did indeed select the correct port. In the second example in FIG. 8(*b*), a case where the last selected port is again port 9 is presented. However, all the READY bits to the RHS of bit 9 are '0'. Thus, there are no READY ports on the RHS of 9 to select from. Thus, the ports on the LHS of port 9 are searched beginning from port 1. The first port which has its READY bit set is port 2, and this becomes the next selected port. It is also observed that that when none of the ports are ready, port 1 is always "selected", i.e. port number 1 appears at the root of the tree. However, its READY bit in is '0', and thus it is inferred that the port is not READY.

The binary tree selects only one of the unicast ports. The tree selection algorithm does not take into account whether or not a multicast port is READY. Thus, there is a final arbitrator that selects between the unicast ports and the multicast ports. The arbitrator defines the following order of precedence to perform the final port selection.

1. Select unicast RT port if its priority ready, else
2. Select unicast NRT port if its priority ready, else
3. Select multicast RT port if its priority ready, else
4. Select multicast NRT port if its priority ready, else
5. Select multicast RT port if its ordinary ready, else
6. Select unicast RT port if its ordinary ready, else
7. Select multicast NRT port if its ordinary ready, else
8. Select unicast NRT port if its ordinary ready.

Figure 9:
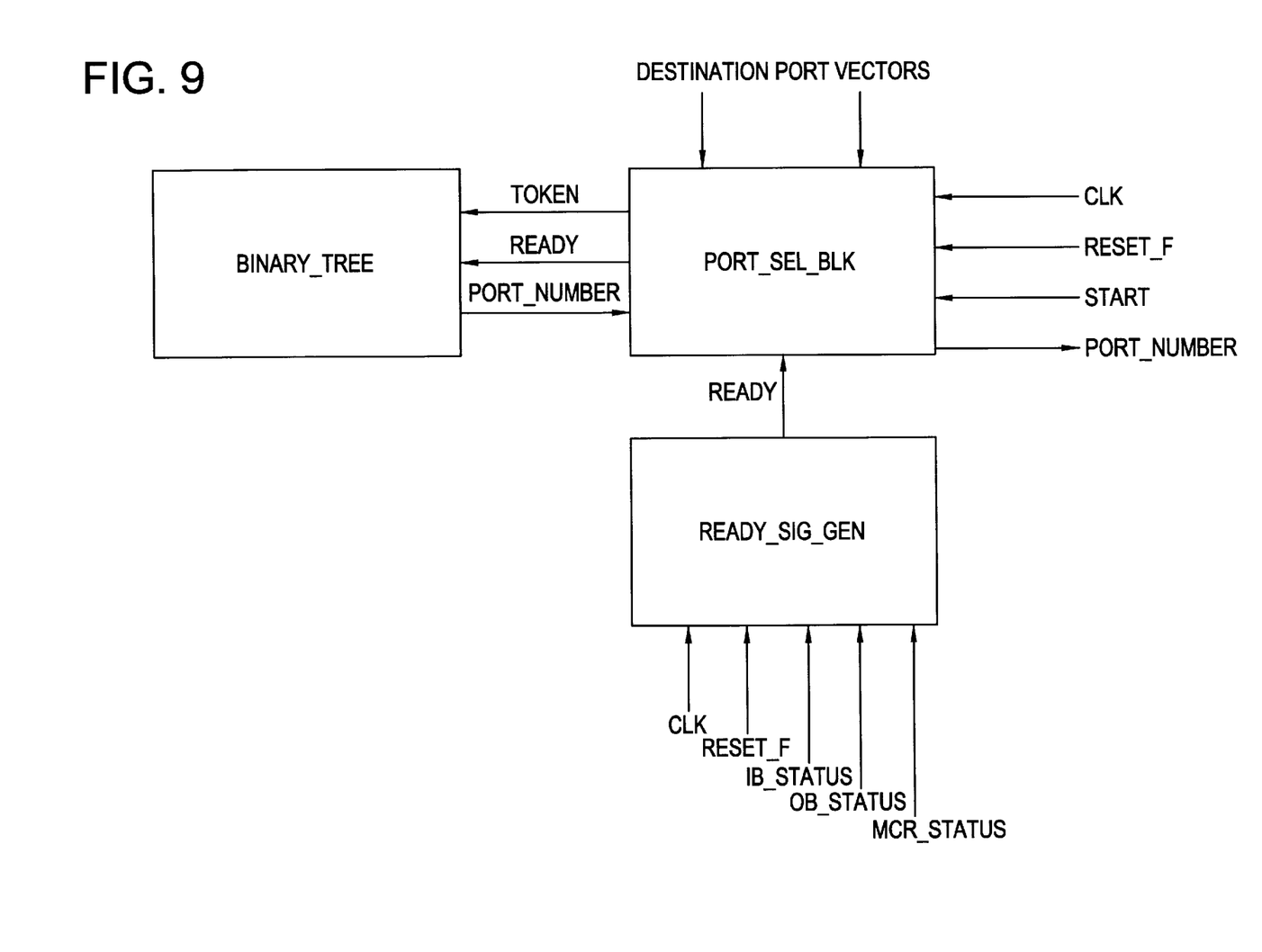
FIG. 9 illustrates an implementation of the round robin scheduler.

The diagram in FIG. 9 shows that the Round-Robin Scheduler (RRS) is implemented as three VHSIC Hardware Description Language (VHDL) entities, where VHSIC is Very High-Speed Integrated Circuit. The blocks correspond to the entities and the arrowed lines represent the signal paths. The function of each block is specified in Table 3, and descriptions of the signals are provided in Table 4.

TABLE 3

| Block Name | Description |
| --- | --- |
| PORT_SEL_BLK | Function: (a) Generate TOKEN vector, (b) Latch in TOKEN and READY vectors at the start of port selection, (c) Initiate port selection using binary tree. |
| READY_SIG_GEN | Function: (a) Generate unicast STOP/SHAPE signals, (b) Generate ordinary ready and priority ready signals, (c) Generate READY vector. |
| BINARY_TREE | 128-node binary tree structure to perform port selection. |

TABLE 4

| Signal Name | No. of Bits | Description |
| --- | --- | --- |
| CLK | 1 | Master clock, 100 MHz. |
| RESET_F | 1 | Active low system RESET. |
| IB_STATUS | 128 | Input buffer status bit-map. |
| OB_STATUS | 128 | Output buffer status bit-map. |
| MCR_STATUS | 128 | Minimum Cell Rate status bit-map. |
| TOKEN | 128 | All leftmost bits from last selected port are '1'. All bits to the right are '0'. |

TABLE 4-continued

| Signal Name | No. of Bits | Description |
| --- | --- | --- |
| READY | 128 | Set to '1' if port is eligible for selection. |
| PORT_NUMBER | 8 | Selected port number. |

To verify the functionality of the scheduler, model of it in VHDL was constructed. It was a Register Transfer Level (RTL) model. The model was tested with a wide variety of values for IB_STATUS, OB_STATUS and MCR_STATUS. Different DPVs were loaded for the multicast ports. The simulations functioned correctly, i.e. the correct responses were obtained with every test case. Next, the model was synthesized to obtain estimates of the gate count and critical path delay. The model was synthesized by a state of the art logic synthesis software tool sold by Synopsys Inc., of Mountain View, Calif. under the tradename SYNOPSYS, using CB-C9 0.35 $\mu$m standard cell technology. The results obtained provided a gate count of 12.5K and a critical delay of 15.5 ns.

The above results for a binary tree structure allows scalability without increasing the delay excessively. The nodes in the tree operate in a "cut-through" manner, and that is one factor that makes the implementation very fast. The scheduler is compact in terms of silicon gate requirements and is also scalable. It can schedule a connection very quickly, in about 15.5 ns.

While a RR scheduler for high-speed ATM switches has been described possessing a binary tree architecture, the present invention is not so limited. Other tree architectures provide similar results besides the binary tree structure, such as a quartinary tree structure. Although the embodiment above describes an implementation of round robin scheduling, the scheduler can also utilize weighted round robin scheduling to the same advantages.

Additional advantages and modifications will readily occur to those skilled in the art. Therefore, the invention in its broader aspects is not limited to the specific details shown and described herein. Accordingly, various modifications may be made without departing from the spirit or scope of the general inventive concept as defined by the appended claims and their equivalents.

What is claimed is:

1. An ATM switch for controlling a flow of ATM cells in a network, comprising:
    input ports;
    output ports; and
    a centralized scheduler, that uses a tree architecture to process packets containing data referencing a previously selected input port, to select a particular input port of said input ports and to send a particular input port ATM cell to a designated output of said output ports.

2. An ATM switch as claimed in claim 1, wherein said centralized scheduler employs cut-through routing to select said particular input port.

3. An ATM switch as claimed in claim 1, wherein said centralized scheduler selects said particular input port based on at least in part detected ready states of said input ports.

4. An ATM switch as claimed in claim 3, wherein each of said ready states are one of a not ready state, an ordinary ready state and priority ready state.

5. An ATM switch as claimed in claim 1, wherein said tree architecture comprises a binary tree structure.

6. An ATM switch as claimed in claim 1, wherein said tree architecture comprises a quartinary tree structure.

7. An ATM switch as claimed in claim 1, wherein said centralized scheduler selects said particular input port based on minimum cell rates of said input ports.

8. An ATM switch as claimed in claim 1, wherein said centralized scheduler selects said particular input port in a multicast connection mode.

9. A method of scheduling input signals arriving at input ports of a switch to be sent to output ports of said switch, comprising the steps of:
    determining ready states of said input ports;
    selecting one of said input ports in a round robin fashion based on said ready states; and
    sending input signals from said selected of said input ports to a designated output port;
    wherein said selecting step uses a tree architecture having a given number of nodes such that packets, containing information related to a previously selected input port, said ready states and said output ports, pass through said nodes and a particular packet is selected having said designated output port.

10. A method of scheduling as claimed in claim 9, wherein each of said given number of nodes has two inputs and one output and determines which input of said two inputs is provided to said output by on the fly comparisons of certain bits of each packet.

11. A method of scheduling as claimed in claim 9, wherein said switch is an ATM switch.

12. A method of scheduling as claimed in claim 9, wherein said tree architecture comprises a binary tree structure.

13. A method of scheduling as claimed in claim 9, wherein said tree architecture comprises a quartinary tree structure.

14. A method of scheduling as claimed in claim 9, wherein each of said ready states are one of a not ready state, an ordinary ready state and priority ready state.

15. A method of scheduling as claimed in claim 9, wherein said step of selecting one of said input ports is conducted in a weighted round robin fashion.

16. A method of scheduling as claimed in claim 9, wherein said step of selecting one of said input ports is also based on minimum cell rates of said input ports.

17. A method of scheduling as claimed in claim 9, wherein said step of sending input signals is performed in a multicast connection mode.

18. An ATM switch for controlling a flow of ATM cells in a network, comprising:
    input ports;
    output ports; and
    a centralized scheduler to process packets containing data referencing a previously selected input port, to select a particular input port of said input ports and to send a particular input port ATM cell to a designated output of said output ports;
    wherein said centralized scheduler functions so that a total processing delay in the flow of the ATM cells in the switch increases only logarithmically when a total number of ports of the switch is increased.

* * * * *